United States Patent [19]

Shikaumi

[11] Patent Number: 4,757,337

[45] Date of Patent: Jul. 12, 1988

[54] RELEASE APPARATUS FOR A CAMERA

[75] Inventor: Masao Shikaumi, Kanagawa, Japan

[73] Assignee: Canon Kabushiki Kaisha

[21] Appl. No.: 843,730

[22] Filed: Mar. 25, 1986

[30] Foreign Application Priority Data

Mar. 26, 1985 [JP] Japan .................................. 60-62835
Jun. 14, 1985 [JP] Japan ................................ 60-129479

[51] Int. Cl.⁴ ..................... G03B 17/38; G08B 23/00; G01J 1/00
[52] U.S. Cl. .................................. 354/266; 354/268; 340/573; 340/584
[58] Field of Search ............... 354/67, 238.1, 266-268, 354/430; 352/179; 358/110, 113; 340/565, 573, 584, 588, 589; 250/338

[56] References Cited

U.S. PATENT DOCUMENTS

| | | | |
|---|---|---|---|
| 2,109,361 | 2/1938 | Spiegel | 354/266 X |
| 3,613,061 | 10/1971 | Lund | 352/179 |
| 4,179,691 | 12/1979 | Keller | 340/565 X |
| 4,346,427 | 8/1982 | Blissett et al. | 340/573 X |
| 4,377,808 | 3/1983 | Kao | 340/565 X |
| 4,418,335 | 11/1983 | Genahr | 340/565 |
| 4,468,658 | 8/1984 | Rossin | 340/565 X |

Primary Examiner—W. B. Perkey
Attorney, Agent, or Firm—Toren, McGeady & Associates

[57] ABSTRACT

A release apparatus for a camera having a temperature sensor adapted particularly to detect a change of the temperature of an image in the picture frame. As an object, such as a man or an animal, comes to enter a target area of the sensor, when the temperature of the area of the picture frame changes, a shutter of the camera is released, or an operation of an auto-focus device is initiated, by the output of the temperature change detector.

5 Claims, 5 Drawing Sheets

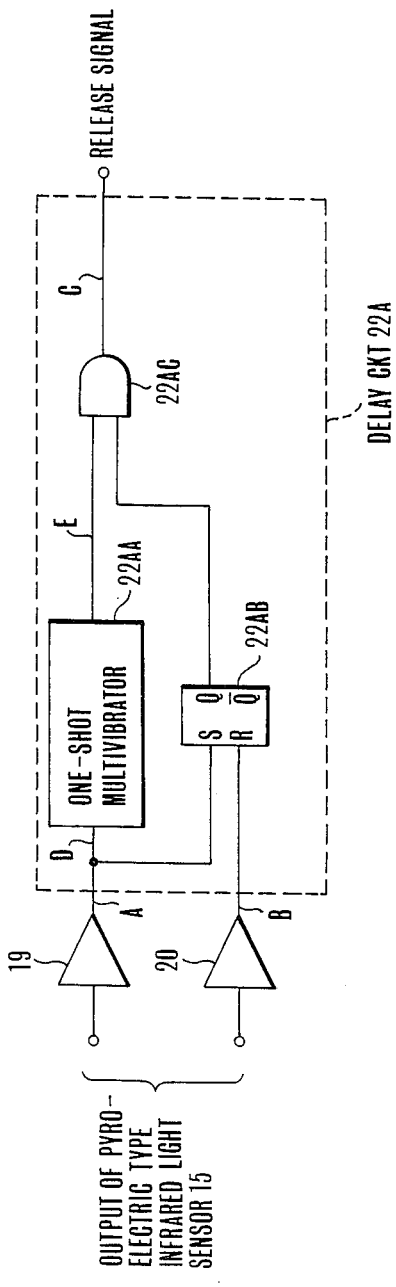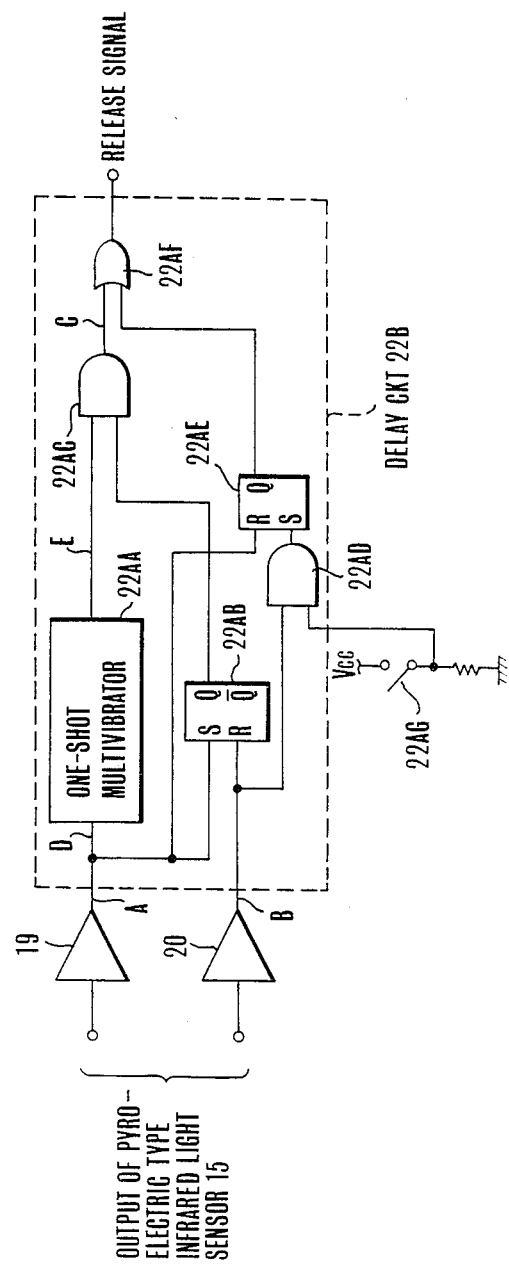

– 1 –

RELEASE APPARATUS FOR A CAMERA

BACKGROUND OF THE INVENTION

1. Field of the Invention

This invention relates to release apparatus for cameras, and, more particularly, to release apparatus for automatically actuating a camera release.

2. Description of the Prior Art

The conventional automatic shooting method is to use a beam projector and a receptor therefor arranged so that the path of the beam from the projector to the receptor lies in the field of view of the camera. When an object, for example, an animal, comes across the path of the beam, the camera is automatically released to effect automatic shooting of the object. Such an apparatus is more fully explained by using FIG. 1.

In FIG. 1, A denotes the beam projector, B the light receptor, and C the camera. The beam projector A comprises a light emitting circuit 1 for driving a light-emitting element 2, for example, LED. Rays of light from the energized LED 2 are collimated by a lens 3. A beam from the projector A is directed to a condenser lens 4 in the receptor B. Light emerging from the lens 4 passes through a filter 5 to a photosensitive element 6 such as a photo-transistor. The output of the photo-transistor 6 is processed by a light receiving circuit 7 to obtain an electrical signal representing whether or not the beam is intercepted by an object 11. The electrical signal after having been amplified by an amplifier circuit 8 is applied to a detector circuit 9. With this apparatus A, B, as the object 11 is moving in a direction of arrow, a, it is, therefore, at a time when it enters the beam, that the output of the processing circuit 7 lowers sharply. By detecting this change, the detector circuit 9 actuates a release of the camera C.

This conventional type of release apparatus allows whatever can block light at any rate to cause a shot to be taken when it enters in between the beam projector A and the receptor B. Hence, there has been a drawback that despite the intention of the photographer being to shoot, for example, a wild animal, even a leaf falling into the beam can trigger the camera, resulting in a large percentage of undesired shots being taken.

SUMMARY OF THE INVENTION

An object of the present invention is to provide a release device for camera which has eliminated the above-described conventional drawback.

To achieve this, according to a preferred embodiment of the invention, means are provided for detecting a temperature change of the area of the field of view of the camera, so that only when an object of different temperature from that of its environment, such as a man or an animal, enters the target area of the camera, is the camera release allowed to be actuated automatically.

Another object is to provide the release apparatus with means responsive to fast movement of the object for annunciating it.

Still another object is to make an automatic shot when an object moves away from the field of view of the camera.

Other objects of the invention will become apparent from the following detailed description of embodiments thereof.

BRIEF DESCRIPTION OF THE DRAWINGS

FIGS. 9 and 10 are block diagrams of the details of two examples of the delay circuit of FIG. 6.

DETAILED DESCRIPTION OF THE PREFERRED EMBODIMENTS

Figure 1:
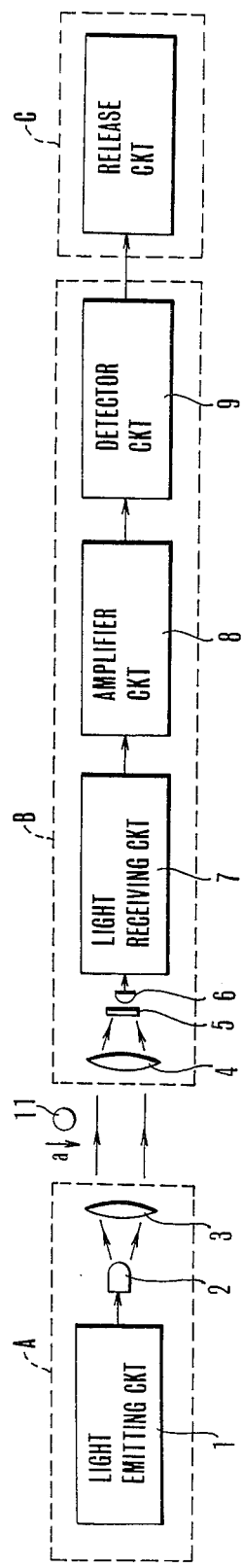
FIG. 1 is a block diagram of the prior known release apparatus.
Figure 2A:
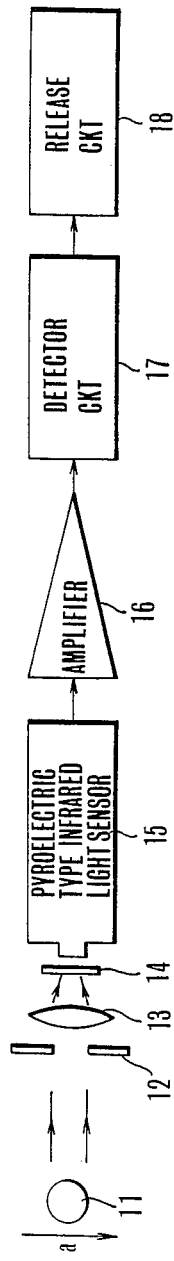
FIG. 2A is a block diagram of a first embodiment of the invention.

In FIG. 2A there is shown the first embodiment of the apparatus according to the invention comprising a field stop 12 arranged in front of an infrared light collection optical system or lens 13 to define an identical field of view for an infrared light sensor 15 of the field of the pyroelectric type to that of view of the camera, a filter 14 for cutting out wavelengths shorter than that of the near infrared light to remove the influence of the sun's light or the like, an amplifier 16 having an input connected to the output of the sensor 15, a detector circuit 17 receptive of an electrical signal from the amplifier 16 for determining whether or not an object to be photographed lies in the field of view, and a release circuit 18 responsive to an output of the detector circuit 17 for actuating either an automatic focusing(AF) circuit, or a shutter in the camera.

Figure 2B:
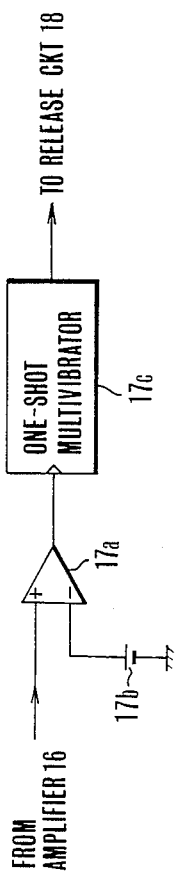
FIG. 2B illustrates the details of the detector circuit 17 of FIG. 2A.

It should be noted here that the infrared light sensor 15 of the pyroelectric type is made of a pyroelectric substance such as polarized ceramic or polyvinylidene fluoride and has a property that when infrared light impinges thereon, its spontaneous polarization is caused to change, and a corresponding amount of electrical charge to the degree of its change is formed at either end of the pyroelectric substrate. In other words, the voltage across the pyroelectric substrate is proportional to the rate of change of the incident infrared light. Also, as the thus-formed charges are gradually neutralized by charges floating in the air, the voltage generated by the incidence of infrared light disappears in a reasonable time. That is, the pyroelectric type infrared light sensor 15 is responsive not to the temperature itself but to a change of the temperature. From this reason, the detector circuit 17 is only required to drive the release circuit 18 when the output of the amplifier 16 rises above a prescribed value. For this purpose, the detector circuit 17 may be constructed as shown in FIG. 2B, comprising a comparator 17a, a reference voltage source 17b and a one-shot multivibrator 17c which is triggered by the rising edge of the output of the comparator 17a.

The operation of the apparatus of FIG. 2 is described below. As a person as the object 11 of different temperature from that of the environment surrounding it is walking in a direction of arrow, a, when an image of the person appears in the searching field of the pyroelectric type infrared light sensor 15 defined by the field stop 12 and the lens 13, the sensor 15 catches infrared rays radiating from the object 11, producing an electrical signal. This signal is amplified by the amplifier 16 and enters the detector circuit 17. Assuming that the amplified electrical signal has a higher value than a threshold value preset in the reference voltage source 17b, the one-shot multivibrator 17c produces an output signal which falls in a prescribed time. Such a signal functions as a start signal for the release circuit 18 as the actuator for the camera. So, the output of the release circuit 18 will drive the AF circuit or the shutter of the camera. Thus, the object 11 is automatically shot as the camera operates in a known manner.

It should be pointed out that the time interval from the moment at which the image of the person starts to appear in the area of the picture frame to the moment at which an exposure is initiated is previously adjusted to a desired value of usually a few seconds, depending on the arrangement of the field stop 12 and the lens 13 and the width of the pulse of the one-shot multivibrator 17c. If the pulse width is made manually variable in a wide range, the release apparatus can be used as a self timer. With such a self-timer, when the photographer desires to take a series of shots of himself in various poses of his choice, the photographer needs only to come into and go out from the field of view of the camera, and has a time long enough to assume the pose.

Next, in case when the speed of movement of the object is so fast that the object gets out from the field of view before that time interval elapses, the shutter chance will be missed. To avoid this, the time interval may be shortened. But, if so, the object will be photographed in blurred condition. This problem is eliminated by prohibiting the camera release from being actuated in the second embodiment of the invention, as shown in FIGS. 3A to 3C.

Figure 3A:
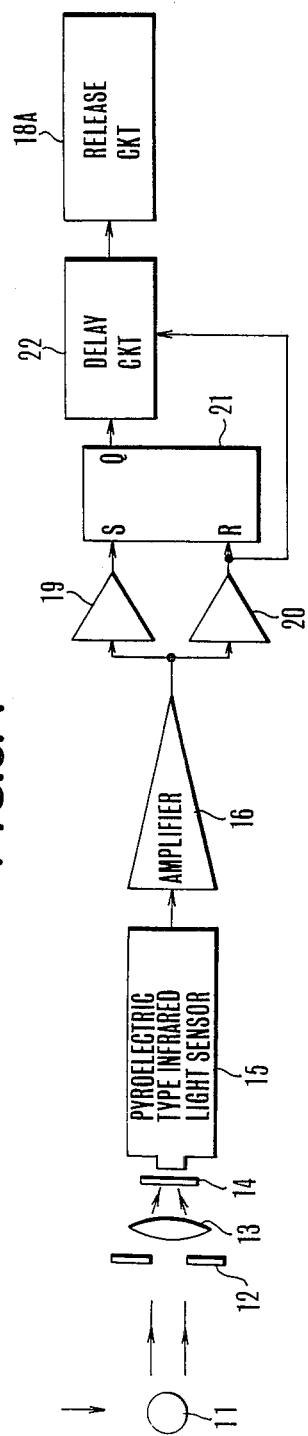
FIG. 3A is a block diagram of a second embodiment of the invention.
Figure 3C:
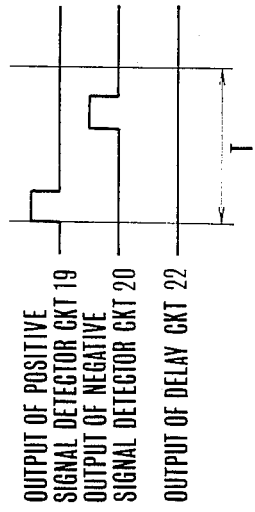
FIGS. 3B and 3C are pulse timing charts illustrating a manner in which the apparatus of FIG. 2 operates.
Figure 3B:
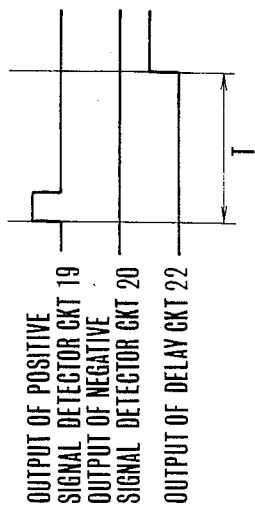

FIG. 3A in block diagram illustrates such an embodiment of the release apparatus, where the same reference characters have been employed to denote parts similar to those shown in FIG. 2A. Similarly to the detector circuit 17, positive and negative signal detector circuits 19 and 20 produce output signals of H level when the output of the amplifier 16 exceeds respective threshold levels. The outputs of the circuits 19 and 20 are connected, respectively, to "set" and "reset" input terminals of an RS flip-flop (hereinafter called RS-FF) 21, of which the output Q is connected to a delay circuit 22. In a time T from the triggering of the delay circuit 22, it produces an output signal which is applied to a release circuit 18A. Meanwhile, with the "reset" input R of the delay circuit 22 maintained at H level, even when it has been triggered, no output signal is given to the release circuit 18A.

Since, as has been described above, a change of the intensity of infrared light incident on the pyroelectric type infrared light sensor 15 induces a voltage therein, for an increase of the intensity of infrared light from zero, the resultant voltage is taken as positive. As the infrared light remains constant at the increased intensity, the voltage drops to zero in a time. Next, when the intensity of infrared light decreases, a negative voltage is produced. Therefore, the entrance of a person or an object of higher temperature than that of the environment into the target area of the sensor 15 causes the positive signal detector circuit 19 to produce an output signal of H level, and the exit of the person therefrom causes the negative signal detector circuit 20 to produce an output signal of H level.

The operation of the apparatus of FIG. 3A is as follows: Now assuming that the speed of movement of the object is not so fast that when the camera release is actuated, either the object can be shot within the picture frame, or no blurred photograph of the object will be taken, then the operation has a mode which is described below by reference to FIG. 3B.

When the object 11 enters the target area of the sensor 15, the positive signal detector circuit 19 produces an output signal of H level, thereby the RS-FF 21 is set to trigger the delay circuit 22. After the prescribed time T has elapsed, the delay circuit 22 produces an output signal which is applied to the release circuit 18. Thus, the camera shoots the object 11.

Alternatively, assuming that the object 11 is moving so fast that actuation of the camera release will take place after it disappears from the field of view of the camera, or that the image of the object will be blurred, then, the operation has another mode which is described below by reference to FIG. 3C.

As the RS-FF 21 was set by the entrance of the object 11 into the target area of the sensor 15, at a time during the operation of the delay circuit 22 or before the termination of duration of the prescribed time T, the object 11 exits from the target area of the sensor 15, causing the latter to produce a negative voltage. As the voltage amplified by the amplifier 16 exceeds the threshold level preset in the negative signal detector circuit 20, the latter produces an output signal of H level, thereby the RS-FF 21 and the delay circuit 22 are reset. Thus, no output signal is given to the release circuit 18, and no shot is taken.

It should also be pointed out that the above-described property of the pyroelectric type infrared light sensor, that its output signal is affected by changes in temperature, not only leads to a change in the output signal in response to a change of the intensity of infrared light of the image formed thereof, but also to a change of the temperature of the sensor itself. To remove any error due to the latter, two pyroelectric elements may be used as arranged in a differential connection for making up the sensor 15 whose output is stabilized against the change of the ambient temperature and is free from spurious signals, as such a structure of the sensor has often been employed in the art.

Figure 4:
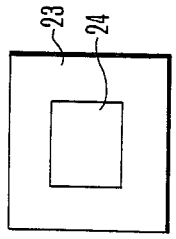
FIG. 4 is a plan view of another example of the sensor usable in the embodiment of the invention.

FIG. 4 illustrates the image receiving area of such a differential type pyroelectric infrared light sensor comprising an outer pyroelectric element 23 and an inner pyroelectric element 24. In the form of FIG. 4, the outer element 23 subtends unavoidably a wider angular field of view of the sensor than that of the inner element 24. As an image of a heat source passes along a central line from one side of the surface of the sensor to the other, because the inner and outer elements 24 and 23 have different fields of view from each other, the outer element 23 first produces an output signal and, as the heat source enters the field of view of the inner element 24, the latter then produces an output signal. It is, therefore, possible to detect when the inner element 24 produces the signal by passing the difference output of the sensor through a comparator. Upon detection of this, the camera is released, as the above-described apparatus and the camera have been so set up. Where to shoot the object can be determined by adjusting the location and the relative size of the inner element 24 to the picture frame in the camera, although the definition of the target area of the sensor cannot digitally be cleared because there is also an overlapping of the viewfield of the sensor near or at the center of the area of the picture frame. This produces an advantage of limiting the target area for shooting the object automatically without having to use any field stop. Another advantage is to stabilize the output of the sensor thanks to the employment of the differential-type structure of construction thereof.

As for the shape of the image receiving area of the sensor, not only the rectangle as shown in FIG. 4, but also a circle or any polygon may be employed provided that the outer and inner areas are positioned in concentric relation.

Figure 5:
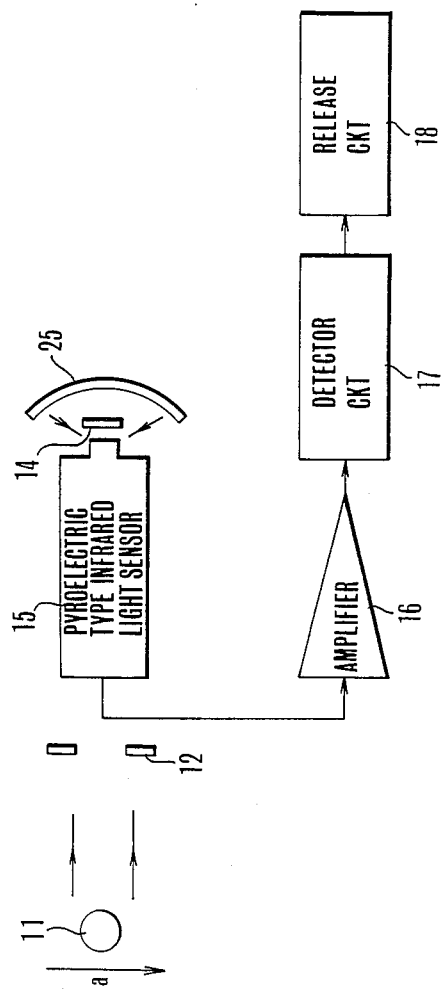
FIG. 5 is a block diagram of a third embodiment of the invention.

FIG. 5, in block diagram illustrates, the construction of a third embodiment of the invention. This embodiment is different from the first one shown in FIG. 2A in that the lens 13 is replaced by a spherical reflection mirror 25. The other parts are similar to those shown in FIG. 2A. The human being or a warm-blooded animal issues infrared light whose spectrum has a peak at about 10 $\mu$m, or far infrared light. The ordinary optical glasses are, on the other hand, opaque to this band of infrared light. For this reason, as the material of the lens 13 of FIG. 2A, use had to be made of a special, expensive material permeable to the far infrared light, for example, zinc selenide (ZnSe). And, even the special material could not be said to have a sufficiently high transmittance. The use of the mirror 25 as in FIG. 5, therefore, give advantages that there is no need to use expensive materials, and a conventional mirror can be used without any modification, so that the cost is suppressed to a minimum, and that the loss of the far infrared light is decreased with increase in the accuracy of detection. Further, it is superior in that the variation of the refractive index with wavelength is no longer necessary to be taken into account.

Though, in FIG. 5, the pyroelectric type infrared light sensor 15 is depicted as if it lies on the axis of the infrared light beam from the object 11, this has been done for the purpose of better understanding of the embodiment. In actual practice, it is, of course, also possible to set up the reflection mirror 25 in inclined relation to the axis of the infrared light beam from the object 11 to allow for off-set arrangement of the sensor 15 from that axis.

Figure 6:
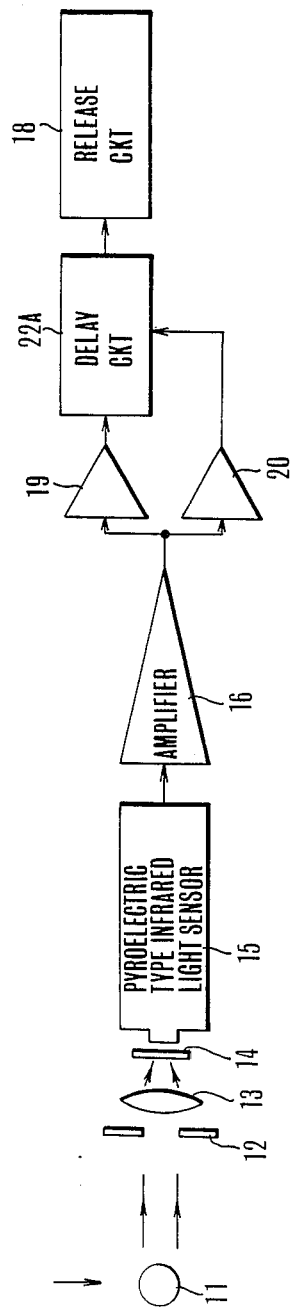
FIG. 6 is a block diagram of a fourth embodiment of the invention.

While, in the FIG. 3A embodiment, a fast moving object prohibits the apparatus from actuating a camera release, it is in the following embodiment (FIG. 6) that even in such a case, the camera release is automatically actuated when the object leaves the target area. In FIG. 6, the same reference characters have been employed to denote the similar parts to those shown in FIG. 3A.

In the fourth embodiment of the invention shown in FIG. 6, a reset circuit-equipped delay circuit 22A has its trigger input connected to the output of the positive signal detector circuit 19, and its reset input connected to the output of the negative signal detector circuit 20. The delay circuit 22A has a property that when an input is given, the output changes from L to H level, and either when a preset time has elapsed, or when an input is given to the reset terminal, the output changes from H to L level. Responsive to the latter change, a release circuit 18 takes a shot.

Figure 8:
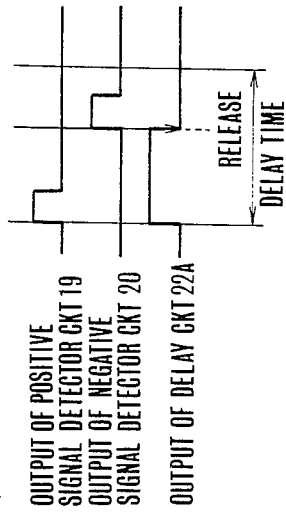
FIGS. 7 and 8 are pulse timing charts illustrating a manner in which the apparatus of FIG. 6 operates.
Figure 7:
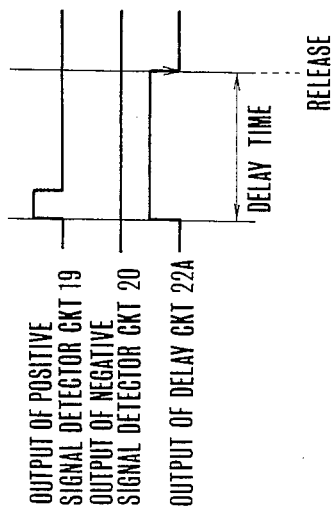

The operation of the apparatus of FIG. 6 is next described by using the timing charts of FIGS. 7 and 8.

When an object of higher temperature than that of the field of view of the pyroelectric type infrared light sensor 15 enters the target area thereof, the temperature of the viewfield of the sensor 15 changes from a low to a high value, and the sensor 15 produces a positive signal. This signal is amplified by the amplifier 16. When the output of the amplifier 16 exceeds a prescribed value, the positive signal detector circuit 19 changes its output from L to H level. Therefore, the output of the delay circuit 22A changes from L to H level.

Now assuming that the object does not get out of the field of view of the sensor 15, then, referring to FIG. 7, the negative signal detector circuit 20 cannot produce an output signal of H level, permitting the delay circuit 22A to change its output from H to L level at the termination of duration of the delay time. Therefore, the release circuit 18A is actuated.

Alternatively, assuming that the object gets out of the field of view of the sensor 15, then, referring to FIG. 8, the temperature of the viewfield of the sensor 15 changes from the high to the low value, causing the sensor 15 to produce a negative signal. When the amplified value of this negative signal by the amplifier 16 falls below a prescribed value, the negative signal detector circuit 20 changes its output from L to H level, thereby the delay circuit 22A is reset. As the output of the delay circuit 22A changes from H to L level, a camera release is actuated by the release circuit 18 likewise as in the former case.

The delay circuit 22A usable in this embodiment may be constructed in various ways, one of which is shown in FIG. 9 where 22AA is a one-shot multivibrator (hereinafter called "one-shot"); 22AB is an RS-flip-flop (RS-FF); and 22AC is an AND gate. When the entrance of a heat source (object) into the viewfield of the sensor 15 is detected by the positive signal detector circuit 19, the one-shot 22AA produces a signal which takes H level for a prescribed time, and the RS-FF 22AB is set.

Then, the output of the AND gate 22AC changes to H level. Either in the above-identified time, as the output of the one-shot 22AA falls from H to L level, or when the RS-FF 22AB is reset as the heat source goes out of the field of view of the sensor 15, the output of the AND gate 22AC then falls from H to L level. Therefore, a camera release is actuated either at a time when the heat source goes out of the viewfield of the sensor 15, or at the termination of duration of the time preset in the one-shot 22AA.

Another example of the delay circuit 22A is shown in FIG. 10, having an additional capability of manually selecting either one of two modes so that when the time the object stays in the viewfield of the sensor 15 is shorter than a prescribed time, a camera release is either actuated or not.

In addition to the parts of FIG. 9, the delay circuit 22B of FIG. 10 includes an AND gate 22AD, an OR gate 22AF, and RS-FF 22AE and a mode selector or switch 22AG accessible from the outside of the apparatus. To automatically actuate a camera release when the object goes out of the viewfield of the sensor 15 (see FIG. 6), the photographer needs to open the switch 22AG. This mode operates in the same manner as that described in connection with FIG. 9. Next with the switch 22AG closed, when the object goes out of the viewfield of the sensor 15, the negative signal detector circuit 20 produces the signal which is then applied through the AND gate 22AD to set the RS-FF 22AE. By the OR gate 22AF, the release signal is maintained at H level, or hindered from changing to L level. Therefore, no release is actuated.

According to this embodiment, determination of whether or not a camera release is actuated when the object exits from the viewfield within the prescribed time after it has once entered therein can be made so as to suit the given photographic situation. For example, in the situation where a person of principal photographic interest lies with many other persons strolling on a road in the background, if a camera release is allowed to be actuated each time one of the persons in the background exits from the viewfield, the percentage of those of the thus-taken photographs which will be found unacceptable is increased. For such a situation, therefore, it is desirable to select the mode that when the time the passerby stays in the viewfield is shorter than the prescribed one, no camera release is actuated.

In the foregoing embodiments of the invention, because the pyroelectric material is sensitive to change of the temperature as has been described above, if the infrared light sensor 15 is constructed with a single element of pyroelectric material, the output of the sensor is included with a spurious signal resulting from the change of the temperature of the element itself. To eliminate this problem, according to the invention shown in FIG. 4, two pyroelectric elements are connected in analogy to the difference amplifier. In this form, the sensor is enabled to be responsive only to the infrared light from the object.

The human being or a warm-blooded animal issues infrared light whose spectrum has a peak at about 10 μm, or far infrared light. The ordinary optical glass is, on the other hand, opaque to this band of infrared light. For this reason, as the material of the lens 13 of FIG. 6, use had to be made of a special, expensive material permeable to the far infrared light, for example, zinc selenide (ZnSe). And, even the special material could not be said to have a sufficiently high transmittance. The use of the mirror 25 as in FIG. 5, therefore, gives advantage that there is no need to use the expensive material, and the conventional mirror can be used without any modification, so that the cost is suppressed to a minimum, and that the loss of the far infrared light is decreased with increase in the accuracy of detection. Further, it is superior in that the variation of the refractive index with wavelength is no longer necessary to take into account.

Though the foregoing embodiments have been described in connection with the pyroelectrical type of infrared light sensor, it is to be understood that the present invention is not confined to such a type, and is applicable to other types of sensors, for example, semiconductor heat sensor (semiconductor having thermoelectric effect) and thermopile. In these cases, it is only required to provide for the sensor with a circuit for producing a signal when the range of variation of the output of the sensor exceeds a prescribed value, for a change of the temperature of the area of the viewfield is detected.

As has been described above, according to the present invention, the release apparatus gets a capability of discriminating between a falling dust or leaf and an object the photographer intends to photograph, as the latter has a different temperature from that of the environment surrounding the object, when a camera release is actuated automatically.

What is claimed is:
1. A release apparatus for a camera, comprising:
  (a) detecting means for detecting a change of temperature within an image plane of the camera in response to an increase in said temperature to produce a first signal, and in response to a decrease in said temperature to produce a second signal;
  (b) trigger signal forming means for producing a trigger signal in a prescribed time from the production of said first signal and, when said second signal is produced before said prescribed time has elapsed, prohibiting said trigger signal from being produced; and
  (c) means responsive to said trigger signal for performing a release operation of the camera.

2. A release apparatus according to claim 1, wherein said trigger signal forming means includes a delay circuit responsive to the first and second signals from said detecting means for initiating a delaying operation and producing said trigger signal in the prescribed time.

3. A release apparatus according to claim 2, wherein said trigger signal producing means further comprises:
  (a) memory means for storing said first signal and for resetting a memorizing operation of said first signal in response to said second signal, said memory means being responsive to the memorizing operation of the first signal for initiating a delaying operation of said delay circuit.

4. A release apparatus according to claim 3, wherein said memory means includes a flip-flop circuit set by the first signal.

5. A release apparatus for a camera, comprising:
  (a) detecting means for detecting a change of temperature within an image plane of said camera in response to an increase in said temperature to produce a first signal, and in response to a decrease in said temperature to produce a second signal;
  (b) trigger signal forming means for producing a trigger signal in a prescribed time from the production of said first signal, and, when said second signal is produced before said prescribed time has elapsed, for producing said trigger signal in response to said second signal; and
  (c) means responsive to said trigger signal for performing a release operation of the camera.

* * * * *